(12) United States Patent
Chan

(10) Patent No.: US 8,052,475 B2
(45) Date of Patent: Nov. 8, 2011

(54) MEMORY CARD SOCKET

(75) Inventor: Chung-Cheng Chan, Taoyuan (TW)

(73) Assignee: Kingconn Technology Co., Ltd, Taoyuan County (TW)

( * ) Notice: Subject to any disclaimer, the term of this patent is extended or adjusted under 35 U.S.C. 154(b) by 55 days.

(21) Appl. No.: 12/496,671

(22) Filed: Jul. 2, 2009

(65) Prior Publication Data

US 2010/0167575 A1 Jul. 1, 2010

(30) Foreign Application Priority Data

Jul. 4, 2008 (TW) ................................ 97211870 U

(51) Int. Cl.
*H01R 24/00* (2006.01)

(52) U.S. Cl. ........................................ 439/630; 439/945

(58) Field of Classification Search .................. 439/188, 439/630, 945, 946, 631
See application file for complete search history.

(56) References Cited

U.S. PATENT DOCUMENTS

| 6,863,571 | B2 * | 3/2005 | Sato et al. ..................... 439/630 |
| 6,932,652 | B1 | 8/2005 | Chen |
| 7,104,846 | B1 * | 9/2006 | Yen ............................... 439/630 |
| 7,114,993 | B2 * | 10/2006 | Chen ............................. 439/630 |
| 7,214,099 | B2 * | 5/2007 | Kikuchi et al. ............... 439/630 |
| 7,422,485 | B2 * | 9/2008 | Yu et al. ........................ 439/630 |
| 7,887,348 | B2 * | 2/2011 | Matsumoto et al. .......... 439/188 |

FOREIGN PATENT DOCUMENTS

TW M257045 2/2005

\* cited by examiner

*Primary Examiner* — Thanh Tam Le
(74) *Attorney, Agent, or Firm* — CKC Partners Co., Ltd.

(57) ABSTRACT

A memory card socket is disclosed. The memory card socket has a body for receiving a memory card, many pins to electrically connect to the memory card, two elastic members for holding the memory card, and a blocking member for restraining one of the two elastic members. In accordance with the format of the memory card, the blocking member can restrain or release the elastic member for holding the memory card.

20 Claims, 11 Drawing Sheets

MEMORY CARD SOCKET

RELATED APPLICATION

This application claims priority of Taiwanese Application No. 097211870, filed on Jul. 4, 2008. The certificate of the aforesaid patent application is hereby provided.

BACKGROUND

1. Technical Field

The present disclosure relates to a memory card socket.

2. Description of Related Art

Some electronic devices have a socket to electrically connect to a memory card, and the user can use the memory card to store data. Because one socket usually fits one format of the memory card and different formats have different widths and heights, the user can't read the memory card when the format of the memory card is different from the user's socket. Thus, it is necessary to develop the socket which can fit many formats of the memory card.

SUMMARY

According to one embodiment of the present invention, a memory card socket includes a body, and the body has a space for a memory card. The memory card socket further includes a plurality of pins, and the pins are disposed in the space to electrically connect the memory card. The memory card socket further includes a first elastic member and a second elastic member. The two elastic members are respectively disposed on the body and extend into the space for holding the memory card. The memory card socket further includes a blocking member, and the blocking member is disposed on the first elastic member. When the first elastic member is not deformed, the blocking member can restrain the second elastic member from being deformed outwardly from the space.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
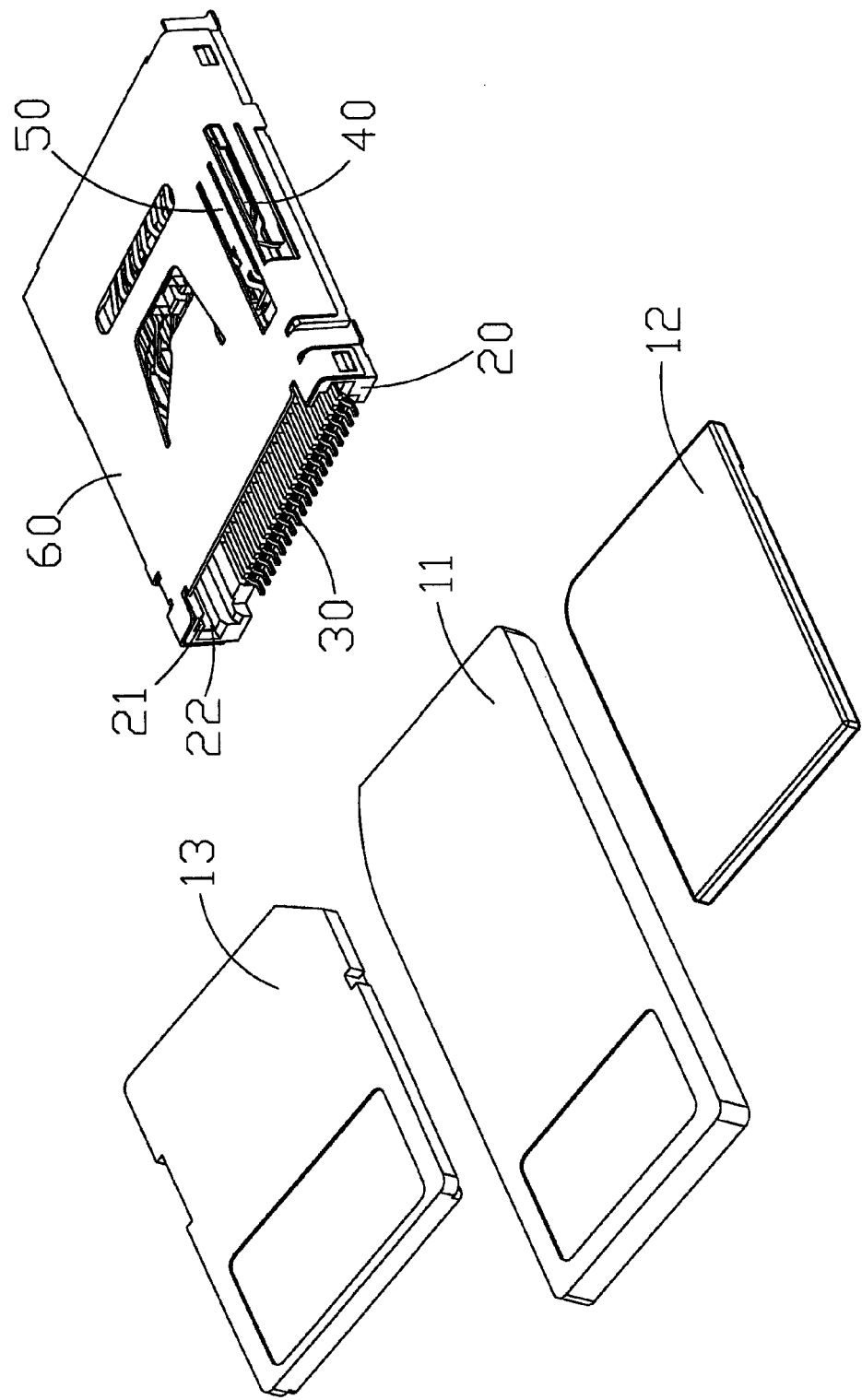
FIG. 1 is a three dimensional view of a memory card socket according to one embodiment of the present invention.
Figure 2:
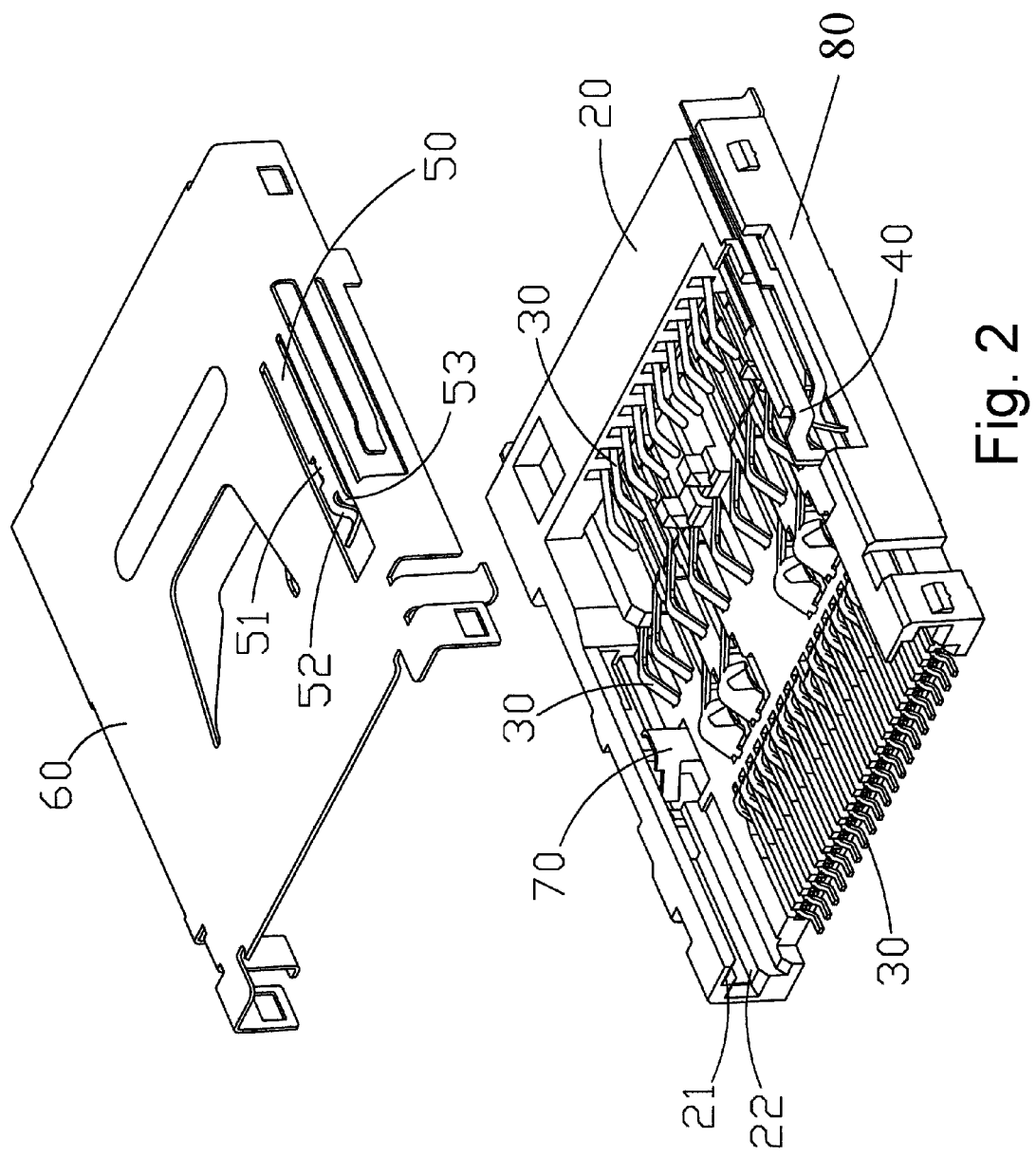
FIG. 2 is an exploded view of the memory card socket of FIG. 1.

FIG. 1 is a three dimensional view of a memory card socket according to one embodiment of the present invention. FIG. 2 is an exploded view of the memory card socket of FIG. 1. The memory card socket includes a body 20, a plurality of pins 30, a first elastic member 50, a second elastic member 40, and a blocking member 51. The body 20 has a first space 21, and the pins 30 are disposed in the first space 21. The two elastic members 40, 50 are respectively disposed on the body 20 and extend into the first space 21. The blocking member 51 is disposed on the first elastic member 50.

Figure 3:
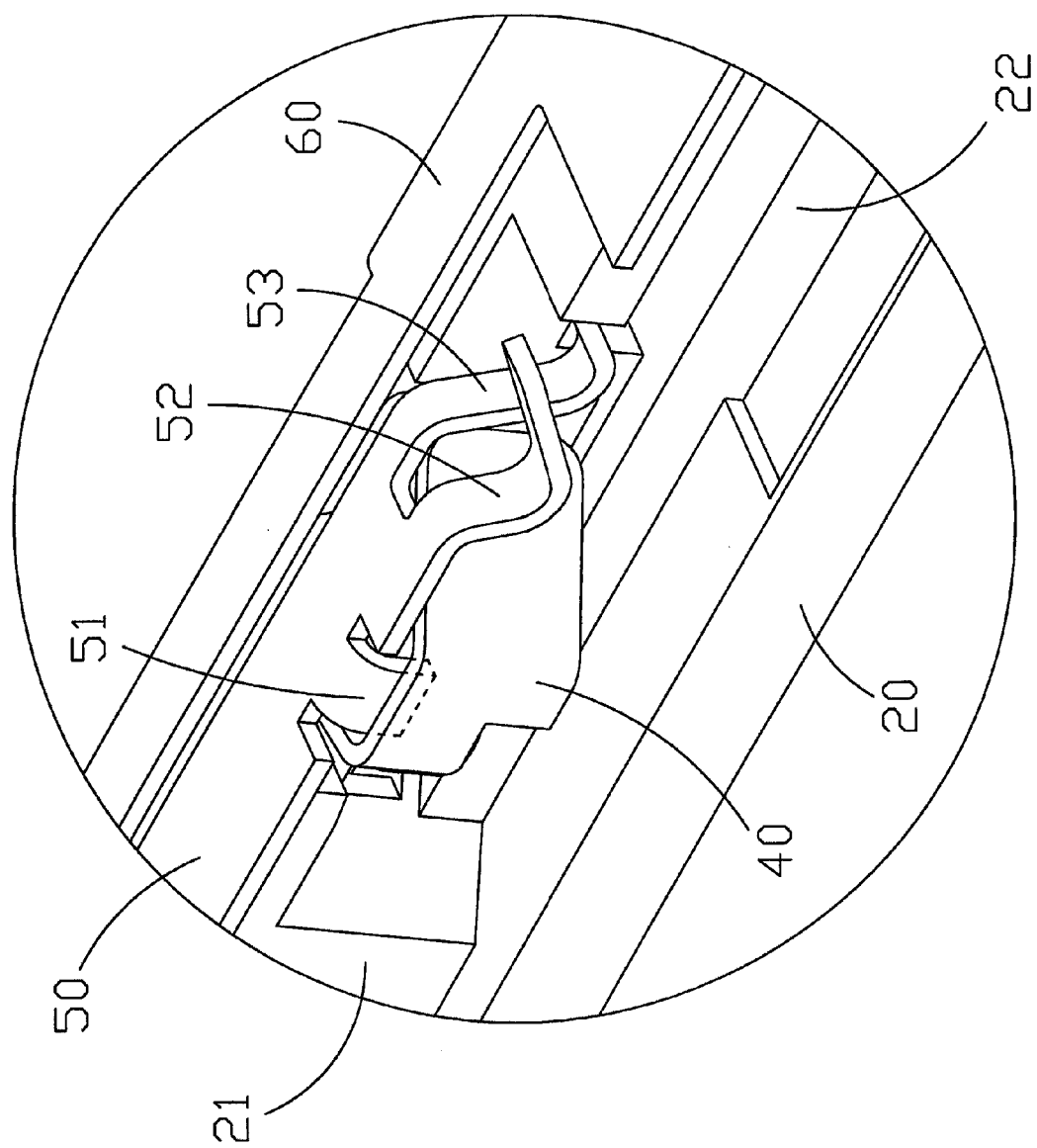
FIG. 3 is a three dimensional view of the first elastic member and the second elastic member of FIG. 2, depicting the first elastic member is not deformed.
Figure 4:
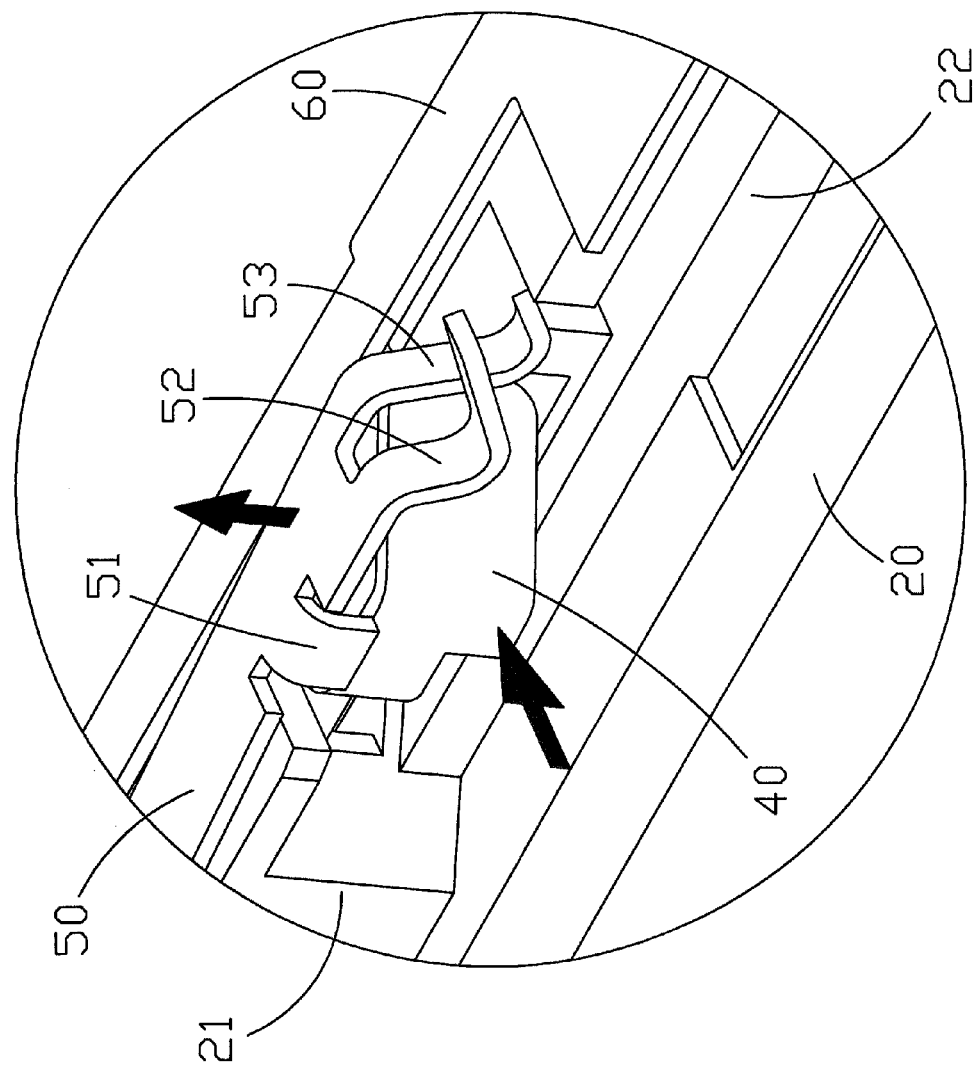
FIG. 4 is a three dimensional view of the first elastic member and the second elastic member of FIG. 2, depicting the first elastic member is deformed.

FIG. 3 is a three dimensional view of the first elastic member and the second elastic member of FIG. 2, depicting the first elastic member is not deformed. FIG. 4 is a three dimensional view of the first elastic member and the second elastic member of FIG. 2, depicting the first elastic member is deformed. When the first elastic member 50 is not deformed, the blocking member 51 can restrain the second elastic member 40 from being deformed outwardly from the first space 21. When the first elastic member 50 is deformed and the blocking member 51 releases the second elastic member 40, the second elastic member 40 can be deformed outwardly from the first space 21.

When the first space 21 receives a memory card, the pins 30 electrically connects to the memory card, and the two elastic members 40, 50 hold the memory card in the first space 21.

Figure 5:
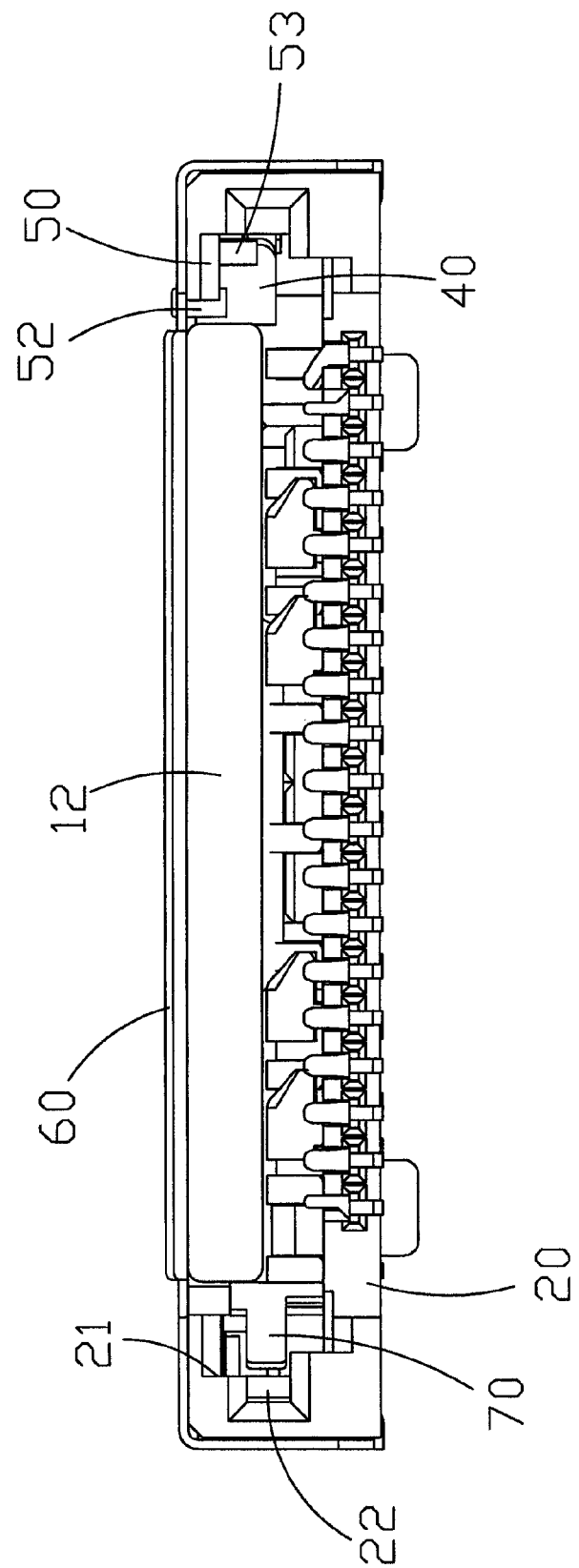
FIG. 5 is a front view of the memory card socket of FIG. 1, depicting a Memory Stick Duo (MS Duo) memory card is inserted into the first space.

FIG. 5 is a front view of the memory card socket of FIG. 1, depicting a Memory Stick Duo (MS Duo) memory card is inserted into the first space. When an MS Duo memory card 12 is inserted into the first space 21, the second elastic member 40 presses the MS Duo memory card 12, and the blocking member 51 restrains the second elastic member 40 from being deformed outwardly from the first space 21. Thus, the first elastic member 50 and the second elastic member 40 can hold the MS Duo memory card 12 in the first space 21.

Figure 6:
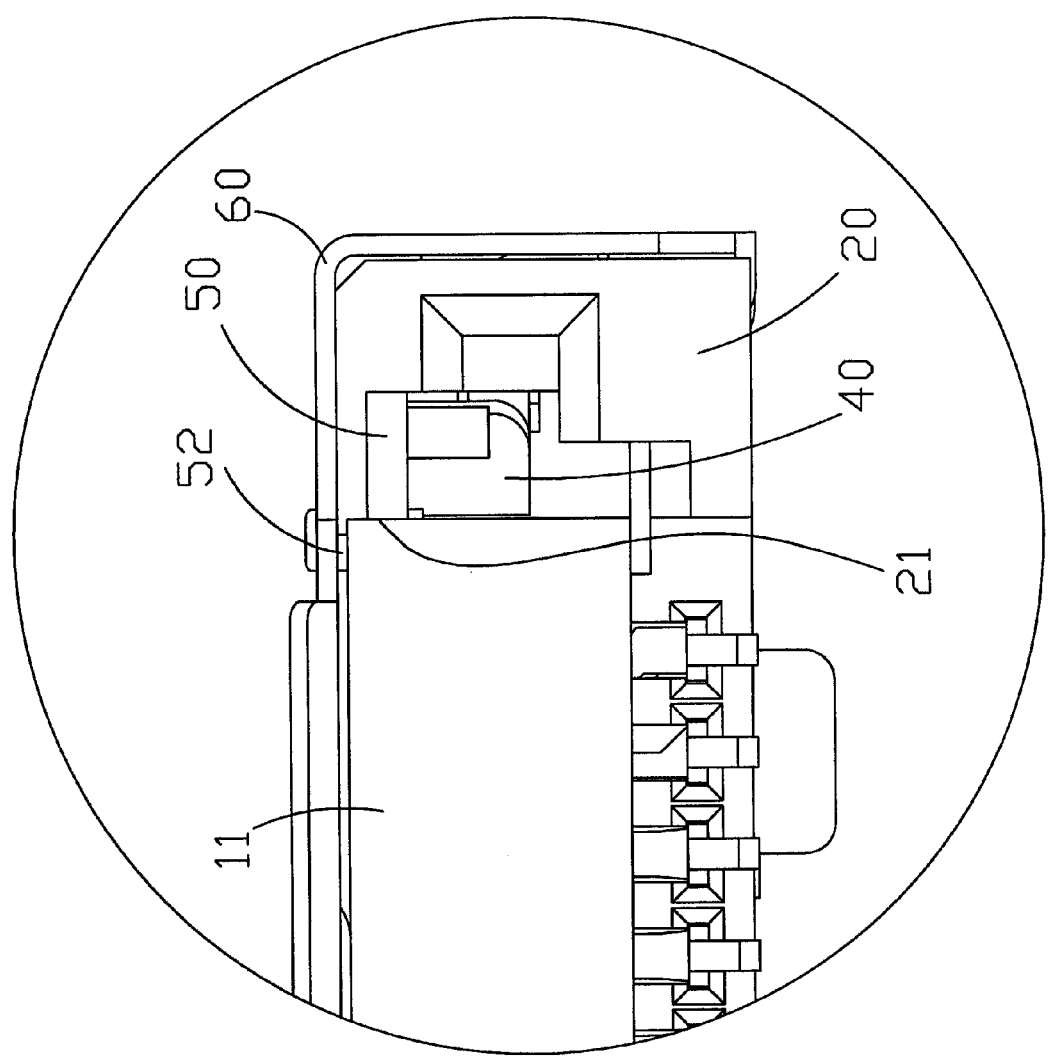
FIG. 6 is a front view of the memory card socket of FIG. 1, depicting a Memory Stick (MS) memory card is inserted into the first space.

FIG. 6 is a front view of the memory card socket of FIG. 1, depicting a Memory Stick (MS) memory card is inserted into the first space. When an MS memory card 11 is inserted into the first space 21, the MS memory card 11 deforms the first elastic member 50, and the blocking member 51 releases the second elastic member 40. Therefore, the second elastic member 40 can be pressed by the MS memory card 11 and deformed outwardly from the first space 21, and the first elastic member 50 and the second elastic member 40 can hold the MS memory card 11 in the first space 21.

Figure 7:
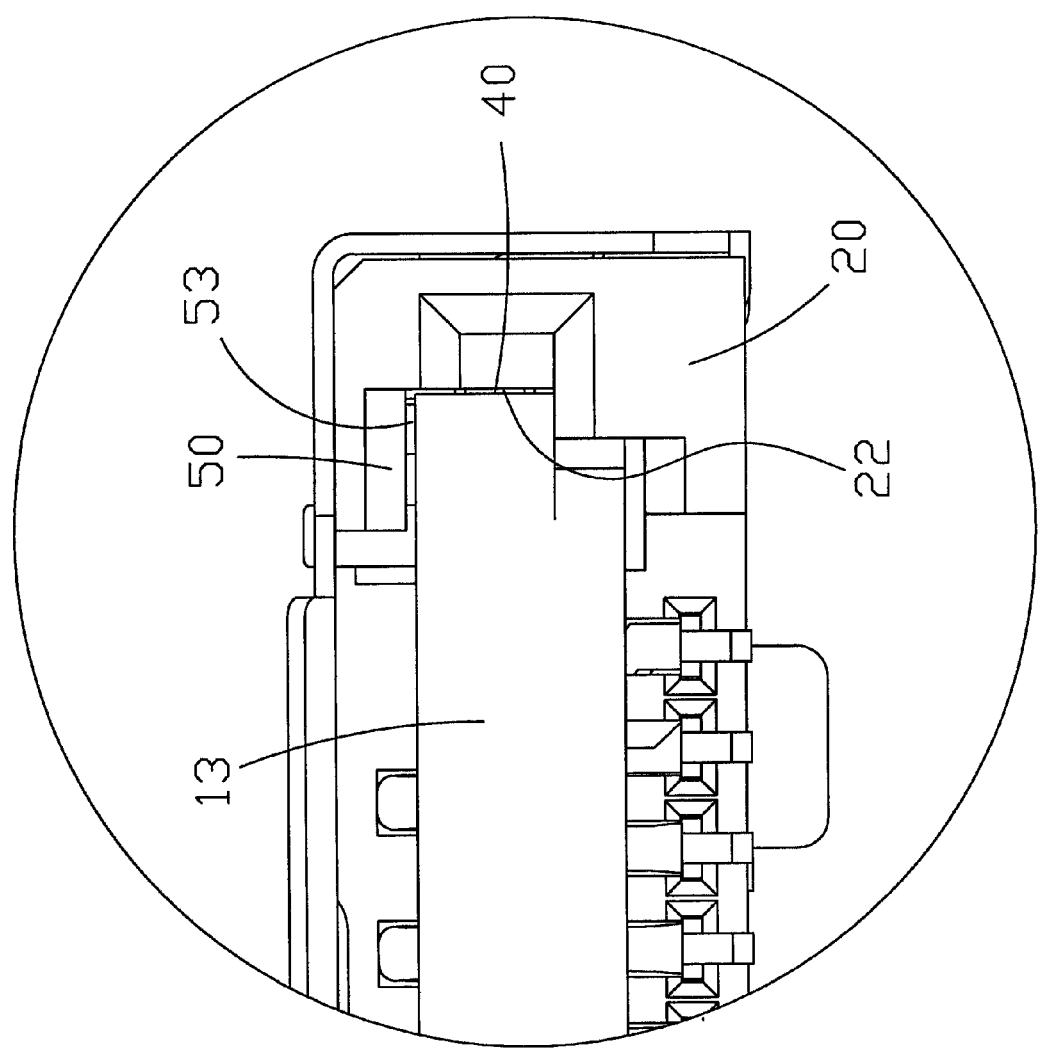
FIG. 7 is a front view of the memory card socket of FIG. 1, depicting a Multimedia Card (MMC) or Secure Digital (SD) memory card is inserted into the second space.

The body 20 has a second space 22, and the second space 22 overlaps the first space 21. FIG. 7 is a front view of the memory card socket of FIG. 1, depicting a Multimedia Card (MMC) or Secure Digital (SD) memory card is inserted into the second space. When an MMC or SD memory card 13 is inserted into the second space 22, the SD memory card 13 deforms the first elastic member 50, and the blocking member 51 releases the second elastic member 40. Therefore, the second elastic member 40 can be pressed and deformed outwardly from the second space 22, and the first elastic member 50 and the second elastic member 40 can hold the SD memory card 13 in the second space 22.

In the foregoing description, the first space 21 is adapted to some memory card formats such as MS and MS Duo, and the second space 22 is adapted to receive some memory card formats such as SD and MMC. In addition, the second elastic member 40 extends into the overlap of the first space 21 and the second space 22. Moreover, the first elastic member 50 has a first extending part 52 and a second extending part 53. The first extending part 52 extends into the first space 21, and the second extending part 53 extends into the second space 22. Thus, an MS memory card 11 can press the first extending part 52 to deform the first elastic member 50, and an MMC or SD memory card 13 can press the second extending part 53 to deform the first elastic member 50.

Figure 8:
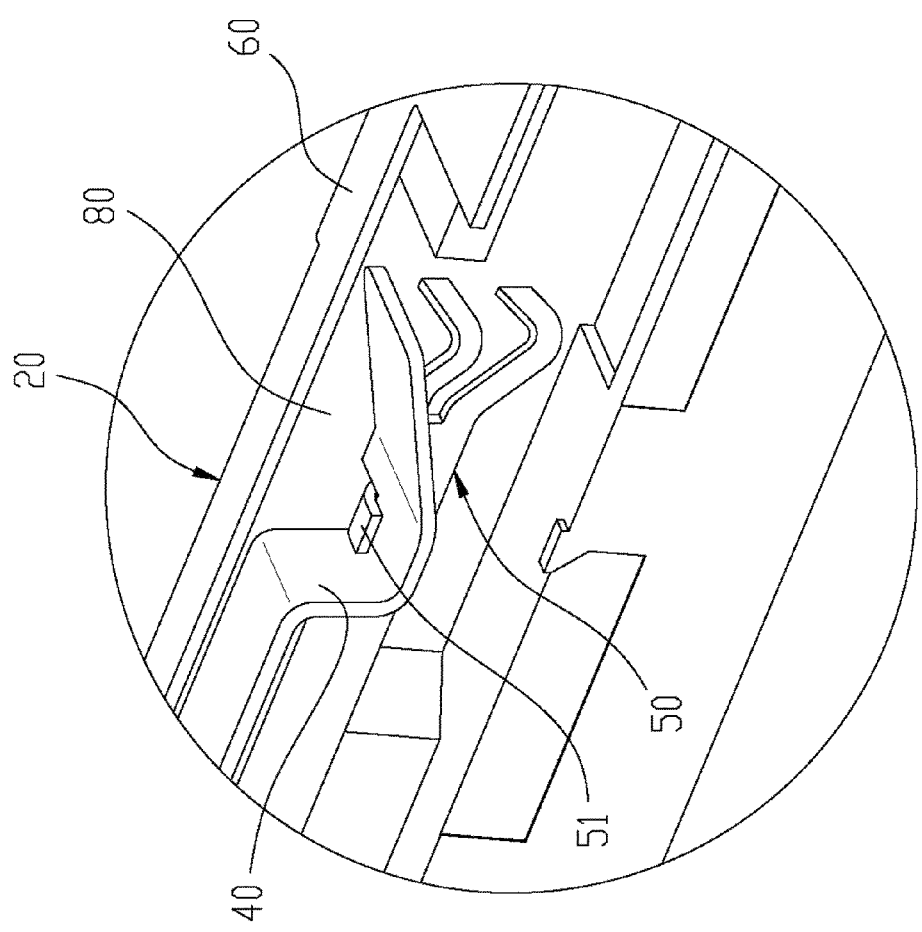
FIG. 8 is a three dimensional view of the first elastic member and the second elastic member of FIG. 2, depicting the first elastic member is disposed on the side wall of the body and the second elastic member is disposed on the top wall of the body.

The first elastic member 50 is disposed on the top wall 60 of the body 20, and the first elastic member 50 is made out of the same metal piece of the top wall 60. The second elastic member 40 is disposed on the side wall 80 of the body 20. Moreover, FIG. 8 is a three dimensional view of the first elastic member 50 and the second elastic member 40 of FIG. 2, depicting the first elastic member 50 is disposed on the side wall 80 of the body 20 and the second elastic member 40 is disposed on the top wall 60 of the body 20. And the second elastic member 40 is made out of the same metal piece of the top wall 60. Therefore the blocking member 51 can block the second elastic member 40 from being deformed horizontally.

Figure 9:
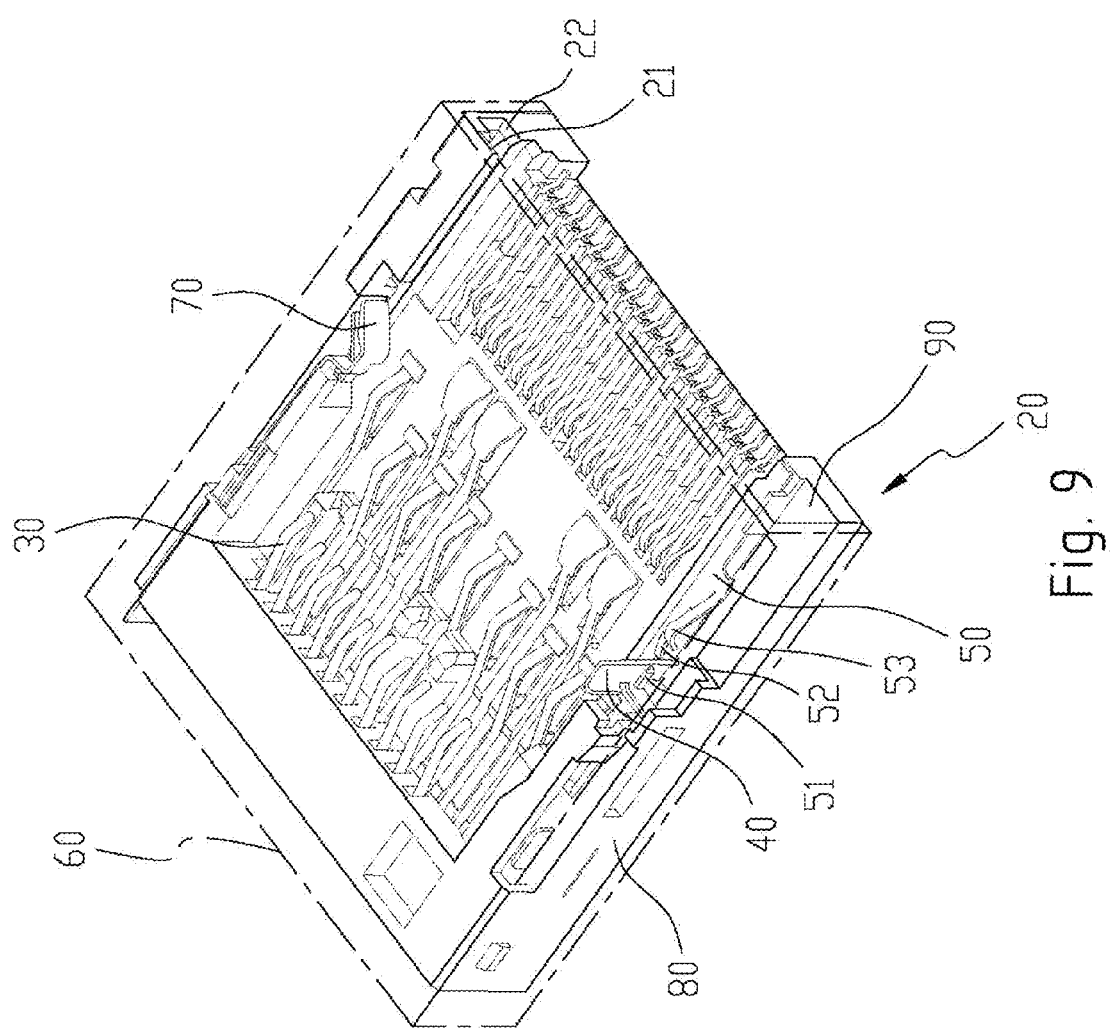
FIG. 9 is a three dimensional view of the memory card socket, depicting the first elastic member is disposed on the bottom wall of the body and the second elastic member is disposed on the side wall of the body.
Figure 10:
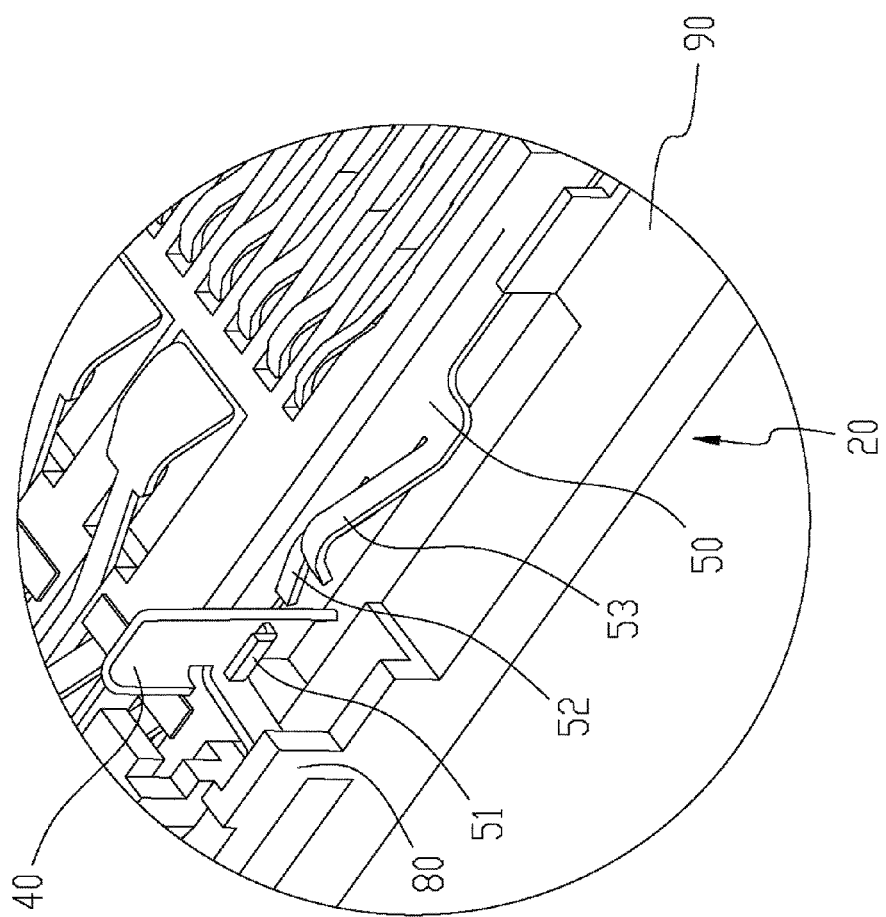
FIG. 10 is a three dimensional view of the first elastic member and the second elastic member of FIG. 9, depicting the first elastic member is disposed on the bottom wall of the body and the second elastic member is disposed on the side wall of the body.
Figure 11:
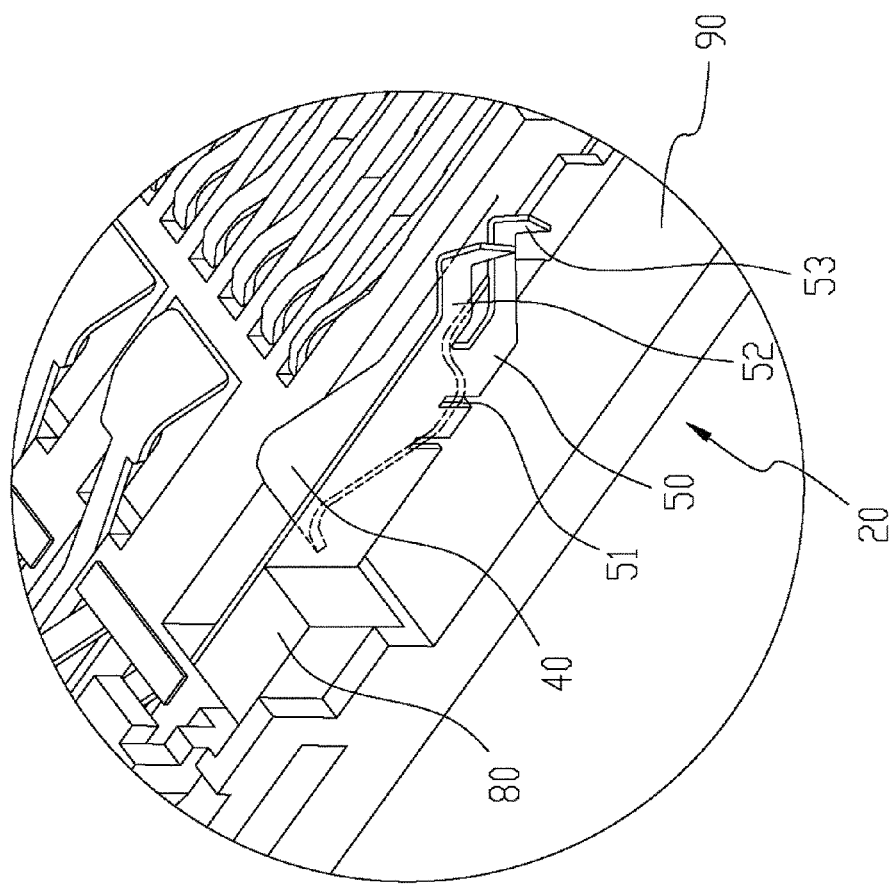
FIG. 11 is a three dimensional view of the first elastic member and the second elastic member of FIG. 9, depicting the first elastic member is disposed on the side wall of the body and the second elastic member is disposed on the bottom wall of the body.

FIG. 9 is a three dimensional view of the memory card socket, depicting the first elastic member 50 is disposed on the bottom wall 90 of the body 20 and the second elastic member 40 is disposed on the side wall 80 of the body 20. FIG. 10 is a three dimensional view of the first elastic member 50 and the second elastic member 40 of FIG. 9, depicting the first elastic member 50 is disposed on the bottom wall 90 of the body 20 and the second elastic member 40 is disposed on the side wall 80 of the body 20. FIG. 11 is a three dimensional view of the first elastic member 50 and the second elastic member 40 of FIG. 9, depicting the first elastic member 50 is disposed on the side wall 80 of the body 20 and the second elastic member 40 is disposed on the bottom wall 90 of the body 20. Therefore the blocking member 51 can block the second elastic member 40 from being deformed vertically.

The body 20 disposes the assistant elastic member 70, and the assistant elastic member 70 extends into the first space 21 and the second space 22. Moreover, the assistant elastic member 70 is opposite to the second elastic member 40, thus the assistant elastic member 70 and the second elastic member 40 can clip and hold the memory card.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A memory card socket comprising:
   a body comprising at least one first space for a memory card;
   a plurality of pins disposed in the first space for electrically connecting the memory card;
   a first and a second elastic members respectively disposed on the body and extending into the first space for holding the memory card; and
   a blocking member disposed on the first elastic member for restraining the second elastic member from being deformed outwardly from the first space when the first elastic member is not deformed.

2. The memory card socket of claim 1, wherein the first elastic member is disposed on a top wall of the body and the second elastic member is disposed on a side wall of the body.

3. The memory card socket of claim 2, wherein said first elastic member disposed on said top wall is made out of the same metal piece of said top wall.

4. The memory card socket of claim 1, wherein the first elastic member is disposed on the side wall of the body and the second elastic member is disposed on the top wall of the body.

5. The memory card socket of claim 4, wherein said second elastic member disposed on said top wall is made out of the same metal piece of said top wall.

6. The memory card socket of claim 1, wherein the first elastic member is disposed on the bottom wall of the body and the second elastic member is disposed on the side wall of the body.

7. The memory card socket of claim 1, wherein the first elastic member is disposed on the side wall of the body and the second elastic member is disposed on the bottom wall of the body.

8. A memory card socket comprising:
   a body comprising at least one first space for a memory card;
   a plurality of pins disposed in the first space for electrically connecting the memory card;
   an elastic member disposed on the body and extending into the first space for holding the memory card; and
   blocking means for restraining the elastic member from being deformed outwardly from the first space when the blocking means is not pressed by the memory card.

9. The memory card socket of claim 8, wherein the elastic member is disposed on a side wall of the body and the blocking means is disposed on a top wall of the body.

10. The memory card socket of claim 8, wherein the body further comprises a second space overlapping the first space.

11. The memory card socket of claim 10, wherein the elastic member extends into an overlap between the first space and the second space.

12. The memory card socket of claim 10, further comprising:
    at least one assistant elastic member disposed on the body and extending into the second space and opposite to said elastic member for holding the memory card.

13. The memory card socket of claim 12, wherein the elastic member is disposed on the top wall of the body and the blocking means is disposed on the side wall of the body.

14. The memory card socket of claim 12, wherein the elastic member is disposed on a side wall of the body and the blocking means is disposed on a top wall of the body.

15. The memory card socket of claim 12, wherein the elastic member is disposed on the bottom wall of the body and the blocking means is disposed on the side wall of the body.

16. The memory card socket of claim 12, wherein the elastic member is disposed on the side wall of the body and the blocking means is disposed on the bottom wall of the body.

17. The memory card socket of claim 12, wherein the body further comprises a second space overlapping the first space.

18. The memory card socket of claim 17, wherein the elastic member extends into an overlap between the first space and the second space.

19. The memory card socket of claim 17, further comprising:

at least one assistant elastic member disposed on the body and extending into the second space and opposite to said elastic member for holding the memory card.

20. The memory card socket of claim 12, further comprising:

at least one assistant elastic member disposed on the body and extending into the first space and opposite to said elastic member for holding the memory card.

* * * * *